United States Patent
Kim

(10) Patent No.: US 7,372,817 B2
(45) Date of Patent: May 13, 2008

(54) APPARATUS AND METHOD FOR OPERATING AND MAINTAINING PRIVATE MOBILE COMMUNICATION SERVICE SYSTEM USING IP NETWORK

(75) Inventor: Ki-Wook Kim, Gunpo (KR)

(73) Assignee: Samsung Electronics Co., Ltd., Suwon-si, Gueonggi-do (KR)

( * ) Notice: Subject to any disclaimer, the term of this patent is extended or adjusted under 35 U.S.C. 154(b) by 842 days.

(21) Appl. No.: 10/773,235

(22) Filed: Feb. 9, 2004

(65) Prior Publication Data
US 2004/0160939 A1 Aug. 19, 2004

(30) Foreign Application Priority Data
Feb. 11, 2003 (KR) .................. 10-2003-0008633

(51) Int. Cl.
*H04J 3/14* (2006.01)
*H04J 1/16* (2006.01)
(52) U.S. Cl. ..................... 370/242; 370/250
(58) Field of Classification Search ............... 370/241, 370/241.1, 242, 244
See application file for complete search history.

(56) References Cited

U.S. PATENT DOCUMENTS

| | | | |
|---|---|---|---|
| 5,974,300 A | 10/1999 | LaPorta et al. | |
| 6,014,429 A | 1/2000 | LaPorta et al. | |
| 6,075,783 A | 6/2000 | Voit | |
| 6,272,129 B1 | 8/2001 | Dynarski et al. | |
| 6,374,078 B1 | 4/2002 | Williams et al. | |
| 6,418,324 B1 | 7/2002 | Doviak et al. | |
| 6,421,714 B1 * | 7/2002 | Rai et al. ..................... | 709/217 |
| 6,466,571 B1 | 10/2002 | Dynarski et al. | |
| 6,493,328 B2 | 12/2002 | Fong et al. | |
| 6,542,497 B1 | 4/2003 | Curry et al. | |
| 6,560,222 B1 | 5/2003 | Pounds et al. | |
| 6,570,871 B1 | 5/2003 | Schneider | |
| 6,628,965 B1 | 9/2003 | LaRosa et al. | |
| 6,990,320 B2 * | 1/2006 | LeCren ..................... | 455/67.11 |
| 7,058,019 B2 * | 6/2006 | Park et al. ................. | 370/252 |
| 2006/0203804 A1 * | 9/2006 | Whitmore et al. ......... | 370/352 |

FOREIGN PATENT DOCUMENTS

JP    2001-326661    11/2001

OTHER PUBLICATIONS

Japanese Office action corresponding to Japanese Patent Application No. 2004-035795, issued on Jun. 13, 2006.

* cited by examiner

*Primary Examiner*—Kwang Bin Yao
*Assistant Examiner*—Tung Q. Tran
(74) *Attorney, Agent, or Firm*—Robert E. Bushnell, Esq.

(57) ABSTRACT

A private mobile communication service system is operated and maintained using an internet protocol (IP) network. The private mobile communication service network has a private base station controller (pBSC) and a base station transceiver subsystem (BTS). The apparatus for operating and maintaining the private mobile communication service includes a wireless system manager (WSM), a hardware alarm collection unit, and a base station controller main processor (BMP). The WSM receives operation/maintenance information, processes the information, creates an operation/maintenance control signal, and transmits the control signal to the pBSC. The alarm collection unit is mounted on the pBSC to collect and output operation/maintenance information, to receive an operation/maintenance control signal, and to generate a reset signal. If operation/maintenance information is received, the BMP ascertains a link address and transmits the link address if it is the WSM. If a control signal is received, the BMP transmits the control signal to the hardware alarm connecting unit.

18 Claims, 8 Drawing Sheets

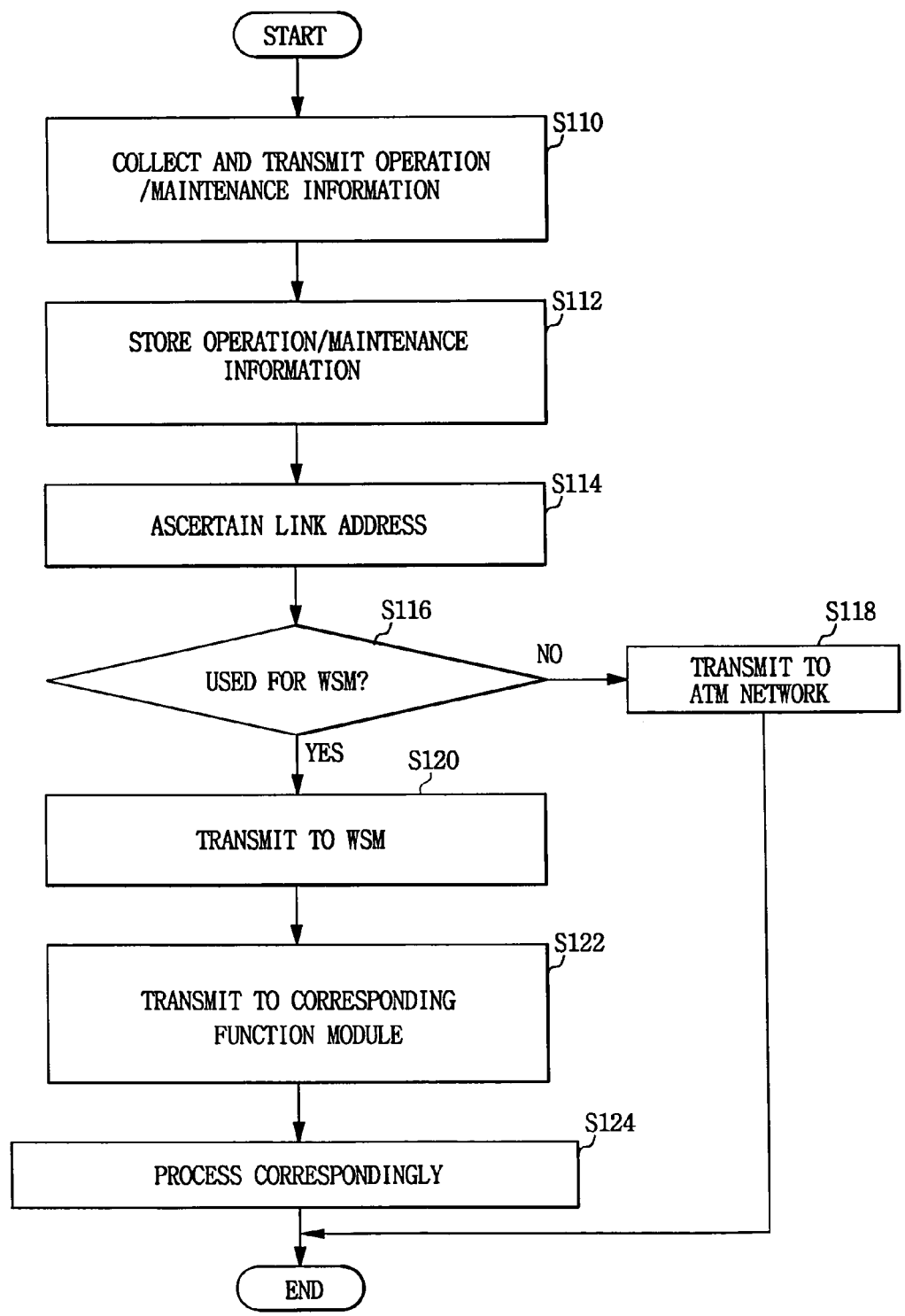

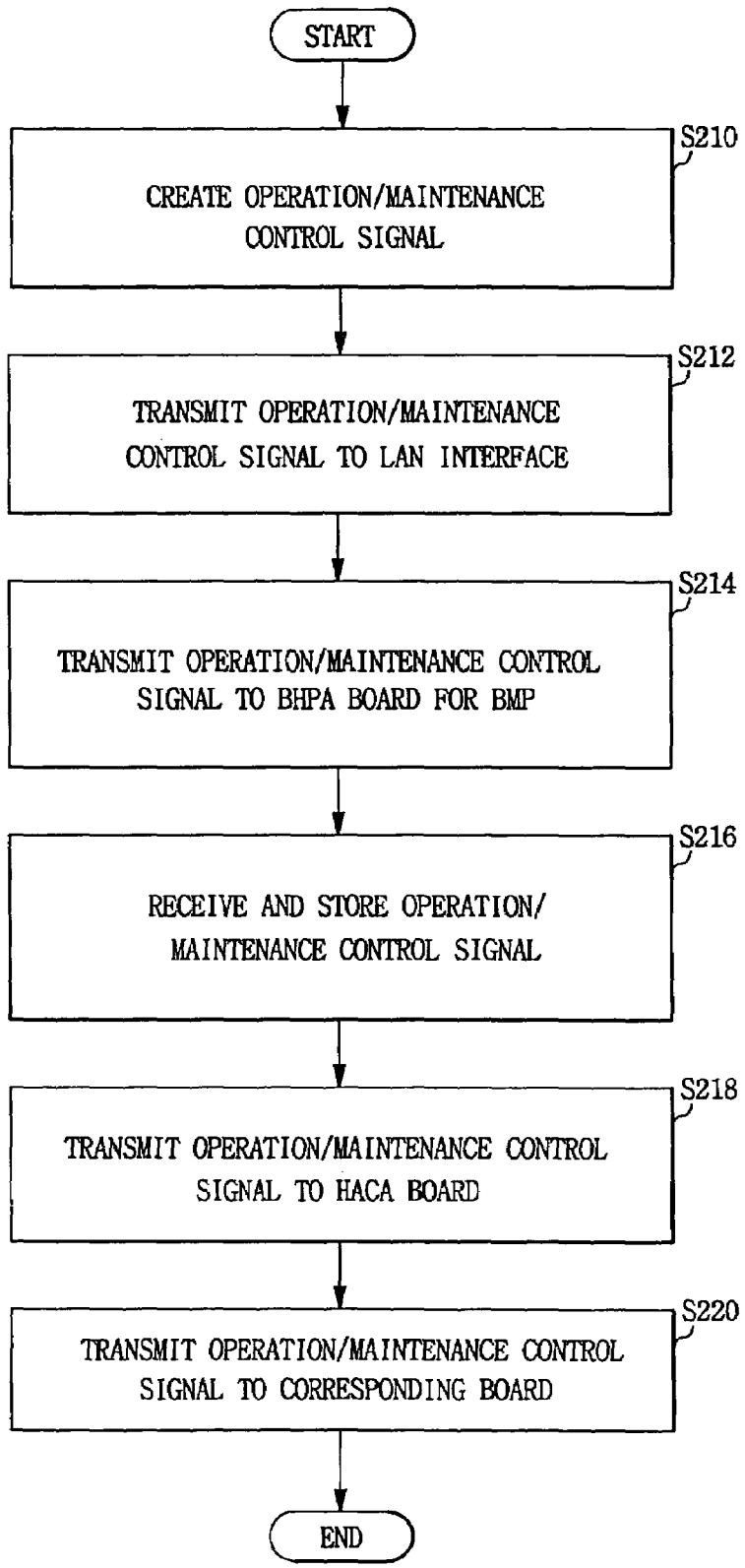

APPARATUS AND METHOD FOR OPERATING AND MAINTAINING PRIVATE MOBILE COMMUNICATION SERVICE SYSTEM USING IP NETWORK

CLAIM OF PRIORITY

This application makes reference to, incorporates the same herein, and claims all benefits accruing under 35 U.S.C. § 119 from an application entitled "APPARATUS AND METHOD FOR OPERATING AND MAINTAINING PRIVATE MOBILE COMMUNICATION SERVICE SYSTEM USING IP NETWORK" earlier filed in the Korean Intellectual Property Office on 11 Feb. 2003 and thereby duly assigned Serial No. 2003-8633.

BACKGROUND OF THE INVENTION

1. Technical Field

The present invention relates generally to an apparatus and method for operating and maintaining a private mobile communication service system using an Internet Protocol network and, more particularly, to an apparatus and method for operating and maintaining a private mobile communication service system using an Internet Protocol network, which is capable of processing operation/maintenance information between the wireless system manager of the private mobile communication service system and the base station controller main processor of a private base station transceiver subsystem in the private mobile communication service system using a local area network.

2. Related Art

Generally, a private wired communication service for voice within a local area is provided through a private branch exchange (PBX) or key phone system, and a communication service for data within a local area is provided through a local area network (LAN) switch and a router using a server.

Further, generally, a mobile communication service can be provided anywhere beyond a limited area, such as a local area. However, such a mobile communication service is provided using a mobile communication service system, and is not constructed to allow a wireless communication to be performed without charge within a specific area.

That is, in order for a terminal of a wired PBX and a mobile terminal of a subscriber to the mobile communication service to communicate with each other, a corresponding terminal is connected to a public network through the exchange thereof, and a call from the terminal is linked to the other.

In this case, the public network includes a mobile communication network and a public switched telephone network (PSTN). Therefore, there is an inconvenience in that, even though a wired communication service subscriber and a mobile communication service subscriber communicate with each other by phone within the same building, a fee is charged for the call.

Therefore, there has been developed a private mobile communication service system which enables telephonic communication without charge when a wired communication service subscriber and a mobile communication service subscriber make a call within the same building (in this case, a mobile communication service system is referred to as a "public mobile communication service system" so as to be differentiated from a private mobile communication service system).

The developed private mobile communication service system enables a mobile communication service subscriber registered with the private mobile communication service to be provided with call service between the subscriber and another subscriber registered with the private mobile communication service, or with a subscriber of an extension telephone connected to a PBX, without charge within an area in which the private mobile communication service is provided.

To provide both the public and private mobile communication services, a service system includes a public/private common cell area, which is a common service area shared between public and private communication services, and a public/private communication service apparatus.

In order to differentiate base station transceiver subsystems (BTSs) belonging to a public mobile communication service system, (as an example) from a private BTS belonging to the public/private common cell area, the private BTS is referred to as a "pBTS."

The pBTS functions to establish a radio communication channel with a mobile station (MS) belonging to the public/private common cell area, and manage radio resources. Further, the pBTS is connected (for example) to a base station controller (BSC) of the public mobile communication service system through the public/private communication service apparatus.

The public/private communication service apparatus is connected to the BSC of the public mobile communication service system, a public switched telephone network/integrated services digital network (PSTN/ISDN), and an internet protocol (IP) network. The public/private communication service apparatus provides a mobile communication service so that public and private mobile communication services are selectively provided to mobile stations in the public/private common cell area, for example.

If the mobile station is registered with the public/private communication service apparatus so as to be capable of being provided with the private mobile communication service, the mobile station can be provided with the private mobile communication service as well as the public mobile communication service.

However, if the mobile station is not registered with the public/private communication service apparatus so as to be provided with the private mobile communication service, the mobile station can only be provided with the public mobile communication service. Further, the public/private communication service apparatus also provides a wired communication service in conjunction with the PSTN/ISDN and the IP network.

The public mobile communication service system is configured so that a BTS and a BSC are separately located and transmit and receive necessary signals to and from each other, whereas the private mobile communication service system is configured so that pBTS and pBSC are located at the same place side by side.

Further, a maintenance and administration personal computer (MAP), used when an operator operates and maintains a pBSC, is connected to the pBSC or pBTS through a LAN so that the operator can easily be made aware of the status of the pBSC and pBTS, thus being capable of easily operating and maintaining the private mobile communication service system.

Moreover, a call manager that controls the radio calls of the private mobile communication service system is connected to the pBSC and the pBTS through the LAN, and functions to operate and manage the radio resources of the pBSC and pBTS.

The call manager is provided with a wireless system manager (WSM) that performs an operation/maintenance function for the pBSC, such as loading, configuration management, statistics measurement, status monitoring, failure control and system tests. The WSM exchanges operation/maintenance information with the pBSC through an optical cable.

That is, by providing the call manager and the pBSC with respective optical transceivers, and connecting the optical transceivers with an optical cable, the pBSC and the WSM of the call manager can exchange operation/maintenance information with each other.

Meanwhile, the pBSC employs a BSC asymmetric transfer mode (ATM) switch network (BAN), which is an ATM switch having a capacity of 2.5 Gbps, to transmit the operation/maintenance information to the WSM of the call manager. The pBSC converts the operation/maintenance information transmitted from the BSC main processor (BMP) of the pBSC into ATM data through the BAN, and transmits the ATM data to the WSM of the call manager through the optical transceivers and the optical cable.

The BAN includes an ATM cell mux/demux board assembly (ACMA) board for multiplexing/demultiplexing ATM cells, an ATM switch fabric board assembly (ASFA) board for providing communication paths between the BMP and other processors, an ATM E1/T1 interface board assembly (AETA) board connected to the pBTS through an E1/T1 link to exchange ATM cells with the pBTS, and an ATM STM-1 interface board assembly (AS1A) board matched to one port of the ASFA board in a ratio of 1:1 to transmit and receive data to and from the WSM of the call manager through low voltage differential signaling (LVDS).

The pBSC transmits the data operation/maintenance information, which is received from the BSM, to the WSM of the call manager through the ACMA board, the ASFA board and the AS1A board through the optical cable.

As described above, the physical connection between the WSM and BMP is accomplished based upon ATM. The BMP of the pBSC is connected to an ATM interface card and the optical cable through the ASFA board and the AI1A board of the BAN positioned in the WSM. However, it can be appreciated that traffic exchanged between the BMP and the WSM is data related to operation/maintenance, and is not time-dependent traffic that requires a guarantee of quality of service (QoS).

Accordingly, it is not necessary for the WSM and the BMP to perform ATM communication based on an expensive ATM network to handle such network traffic.

The following patents are considered to be generally pertinent to the present invention, but are burdened by the disadvantages set forth above:

U.S. Pat. No. 6,628,965 to LaRosa et al., entitled COMPUTER METHOD AND SYSTEM FOR MANAGEMENT AND CONTROL OF WIRELESS DEVICES, issued on Sep. 30, 2003; U.S. Pat. No. 6,570,871 to Schneider, entitled INTERNET TELEPHONE SERVICE USING CELLULAR DIGITAL VOCODER, issued on May 27, 2003; U.S. Pat. No. 6,542,497 to Curry et al., entitled PUBLIC WIRELESS/CORDLESS INTERNET GATEWAY, issued on Apr. 1, 2003; U.S. Pat. No. 6,493,328 to Fong et al., entitled ACTIVE SET MANAGEMENT IN CELLULAR WIRELESS NETWORK THAT SUPPORTS HIGH DATA RATE FORWARD LINK TRANSMISSIONS, issued on Dec. 10, 2002; U.S. Pat. No. 6,466,571 to Dynarski et al., entitled RADIUS-BASED MOBILE INTERNET PROTOCOL (IP) ADDRESS-TO-MOBILE IDENTIFICATION NUMBER MAPPING FOR WIRELESS COMMUNICATION, issued on Oct. 15, 2002; U.S. Pat. No. 6,421,714 to Rai et al., entitled EFFICIENT MOBILITY MANAGEMENT SCHEME FOR A WIRELESS INTERNET ACCESS SYSTEM, issued on Jul. 16, 2002; U.S. Pat. No. 6,418,324 to Doviak et al., entitled APPARATUS AND METHOD FOR TRANSPARENT WIRELESS COMMUNICATION BETWEEN A REMOTE DEVICE AND HOST SYSTEM, issued on Jul. 9, 2002; U.S. Pat. No. 6,374,078 to Williams et al., entitled WIRELESS COMMUNICATION SYSTEM WITH MULTIPLE EXTERNAL COMMUNICATION LINKS, issued on Apr. 16, 2002; U.S. Pat. No. 6,272,129 to Dynarski et al., entitled DYNAMIC ALLOCATION OF WIRELESS MOBILE NODES OVER AN INTERNET PROTOCOL (IP) NETWORK, issued on Aug. 7, 2001; U.S. Pat. No. 6,075,783 to Voit, entitled INTERNET PHONE TO PSTN CELLULAR/PCS SYSTEM, issued on Jun. 13, 2000; U.S. Pat. No. 6,014,429 to LaPorta et al., entitled TWO-WAY WIRELESS MESSAGING SYSTEM WITH TRANSACTION SERVER, issued on Jan. 11, 2000; U.S. Pat. No. 5,974,300 to LaPorta et al., entitled TWO-WAY WIRELESS CELLULAR MESSAGING SYSTEM, issued on Oct. 26, 1999; and U.S. Pat. No. 6,560,222 to Pounds et al., entitled SYSTEMS AND METHODS FOR MULTIPLE VOICE AND DATA COMMUNICATIONS USING INTELLIGENTLY BRIDGED TDM AND PACKET BUSES AND METHODS FOR PERFORMING TELEPHONY AND DATA FUNCTIONS USING THE SAME, issued on May 6, 2003.

SUMMARY OF THE INVENTION

Accordingly, the present invention has been developed while keeping in mind the above problems occurring in the prior art, and an object of the present invention is to provide a system and method for operating and maintaining a private mobile communication service system using an IP network, in which system the ATM data communication performed between a WSM and a BMP, and based upon an ATM network, is replaced with LAN communication based upon Fast Ethernet, thus reducing the cost of the installation and of use of the WSM system, and improving flexibility.

In order to accomplish the above object, the present invention provides an apparatus for operating and maintaining a private mobile communication service system using an IP network, the private mobile communication service network having a pBSC and a BTS, the apparatus including: a WSM for receiving operation/maintenance information from the pBSC through the IP network, for processing the operation/maintenance information, for creating an operation/maintenance control signal, and for transmitting the operation/maintenance control signal to the pBSC through the IP network; a hardware alarm collection unit mounted on the pBSC for collecting operation/maintenance information from each of a plurality of boards, for outputting the operation/maintenance information, for receiving an operation/maintenance control signal from each board, and for generating a reset signal for each board; and a BMP responsive to the operation/maintenance information being received from the hardware alarm collection unit for ascertaining a link address and transmitting the operation/maintenance information if the link address is the WSM, and responsive to the operation/maintenance control signal being received from the WSM though the IP network for transmitting the operation/maintenance control signal to the hardware alarm connecting unit.

In accordance with another embodiment of the present invention, there is provided a method of operating and maintaining a private mobile communication service system using an IP network, the private mobile communication service network having a pBSC and a BTS, the method including the steps of: ascertaining, via a BMP, a link address of operation/maintenance information of each of a plurality of boards collected by a hardware alarm collection unit; when the link address is a WSM as ascertained in the first step, transmitting, via the BMP, the operation/maintenance information to the WSM through the IP network for processing of the operation/maintenance information by the WSM; creating, via the WSM, an operation/maintenance control signal, and transmitting the operation/maintenance control signal to the BMP through the IP network; and receiving, at the BMP, the operation/maintenance control signal, and transmitting the operation/maintenance control signal to the hardware alarm collection unit, the hardware alarm collection unit creating and outputting a reset signal for each of the respective boards.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein:

FIG. 7 is a flowchart of the processing of operation/maintenance information in the private mobile communication service system using the LAN in accordance with an embodiment of the present invention; and FIG. 8 is a flowchart of the processing of an operation/maintenance control signal in the private mobile communication service system using the LAN in accordance with an embodiment of the present invention

DESCRIPTION OF THE PREFERRED EMBODIMENTS

Figure 1:
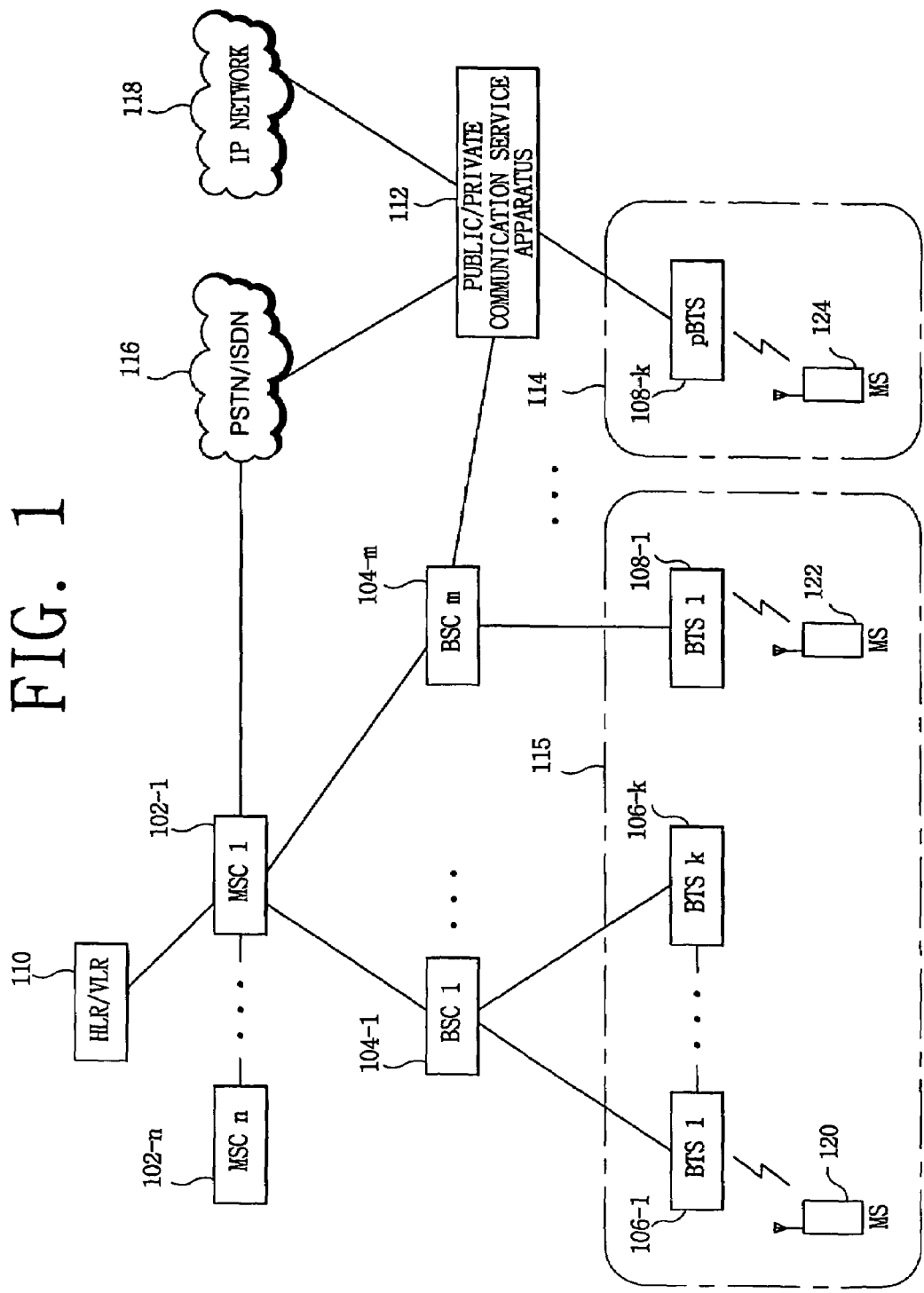
FIG. 1 is a diagram of a network structure illustrating the concept of public and private mobile communication services.

Reference now should be made to the drawings, in which the same reference numerals are used throughout the different drawings to designate the same or similar components.

FIG. 1 is a diagram of a network structure illustrating the concept of public and private mobile communication services.

As shown in FIG. 1, to provide both the public and private mobile communication services, a service system includes a public/private common cell area 114, which is a common service area shared between public and private communication services, and a public/private communication service apparatus 112.

In order to differentiate base station transceiver subsystems (BTSs) belonging to a public mobile communication service system 115 (that is, BTSs 106-1 to 106-k and 108-1 shown in FIG. 1 as examples) from a private BTS 108-k belonging to the public/private common cell area 114, the private BTS 108-k is referred to as a "pBTS."

The pBTS 108-k functions to establish a radio communication channel with a mobile station (MS) 124 belonging to the public/private common cell area 114, and manage radio resources. Further, the pBTS 108-k is connected to a base station controller (BSC) of the public mobile communication service system (for example, the BSC 104-m shown in FIG. 1) through the public/private communication service apparatus 112.

The public/private communication service apparatus 112 is connected to the BSC 104-m of the public mobile communication service system, a public switched telephone network/integrated services digital network (PSTN/ISDN) 116, and an internet protocol (IP) network 118. The public/private communication service apparatus 112 provides a mobile communication service so that public and private mobile communication services are selectively provided to MSs in the public/private common cell area 114 (for example, the MS 124 of FIG. 1).

If the MS 124 is registered with the public/private communication service apparatus 112 so as to be capable of being provided with private mobile communication service, the MS 124 can be provided with the private mobile communication service as well as the public mobile communication service.

However, if the MS 124 is not registered with the public/private communication service apparatus 112 so as to be provided with private mobile communication service, the MS 124 can only be provided with public mobile communication service. Further, the public/private communication service apparatus 112 also provides wired communication service in conjunction with the PSTN/ISDN 116 and the IP network 118.

Figure 2:
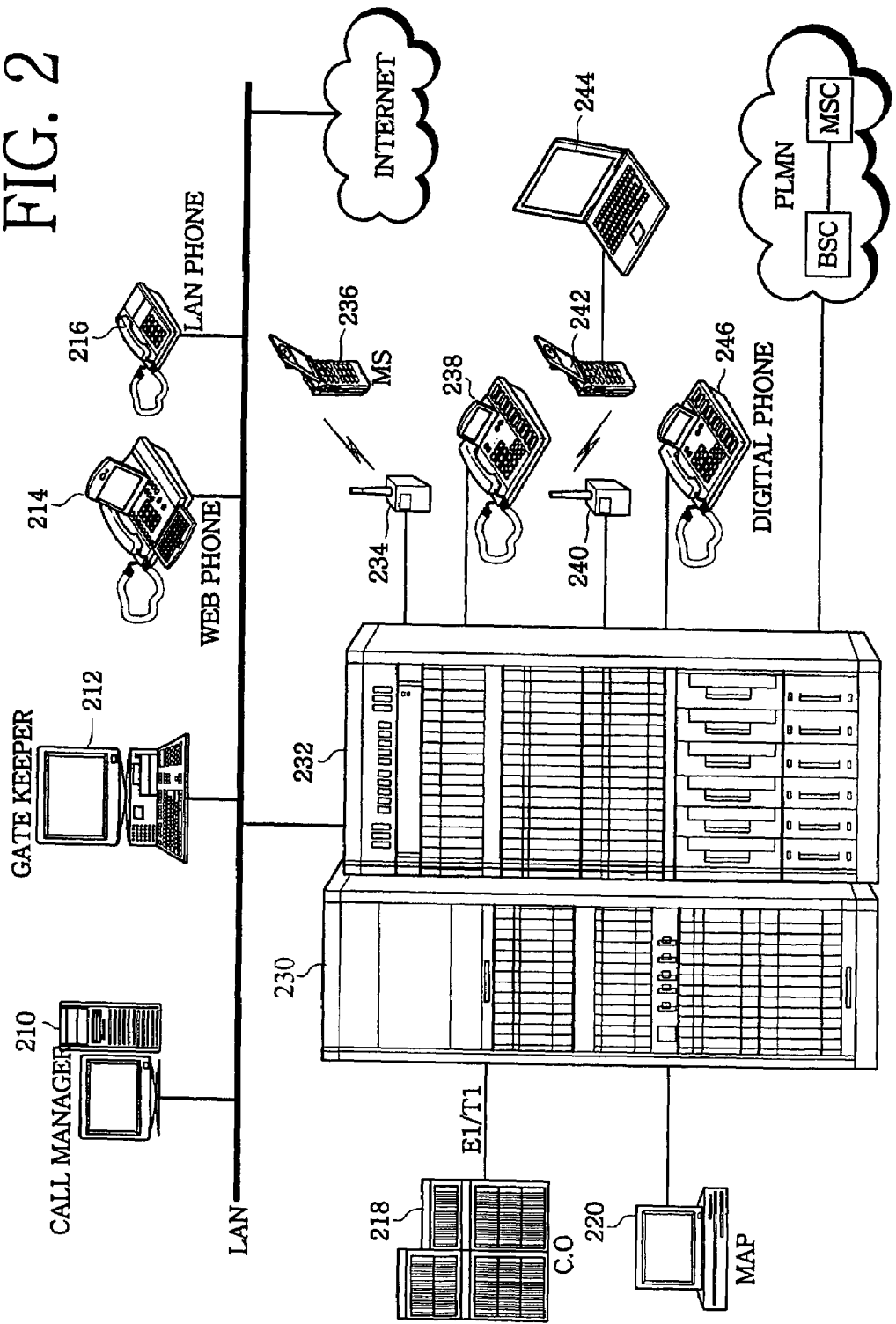
FIG. 2 is a configuration diagram of a private mobile communication service system.

FIG. 2 is a configuration diagram of a private mobile communication service system. The public mobile communication service system is configured so that a BTS and a BSC are separately located, and transmit and receive necessary signals to and from each other, whereas the private mobile communication service system is configured so that a pBTS 232 and pBSC 230 are located at the same place side by side.

Further, a maintenance and administration personal computer (MAP) 220, used when an operator operates and maintains a pBSC, is connected to the pBSC 230 or pBTS 232 through a LAN so that the operator can easily be made aware of the status of the pBSC 230 and pBTS 232, thus being capable of easily operating and maintaining the private mobile communication service system.

Further, a call manager 210 for controlling the radio calls of the private mobile communication service system is connected to the pBSC 230 and the pBTS 232 through the LAN, and functions to operate and manage the radio resources of the pBSC 230 and pBTS 232.

The call manager 210 is provided with a wireless system manager (WSM) that performs an operation/maintenance function for the pBSC 230, such as loading, configuration management, statistics measurement, status monitoring, failure control and system tests. The WSM exchanges operation/maintenance information with the pBSC 230 through an optical cable.

Figure 3:
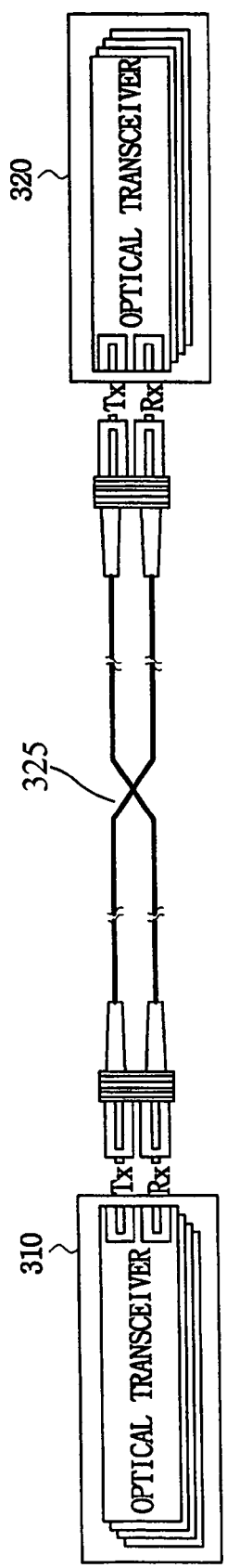
FIG. 3 is a diagram showing an example of an optical cable for providing connection between a call manager and a pBSC.

That is, as understood from FIG. 3, by providing the call manager 210 and the pBSC 230 with optical transceivers 310 and 320, respectively, and connecting the optical transceivers 310 and 320 with an optical cable 325, the pBSC 230 and the WSM of the call manager 210 can exchange operation/maintenance information with each other.

Meanwhile, the pBSC 230 employs a BSC asymmetric transfer mode (ATM) switch network (BAN), which is an ATM switch having a capacity of 2.5 Gbps, to transmit the operation/maintenance information to the WSM of the call manager 210. The pBSC 230 converts the operation/maintenance information, transmitted from the BSC main processor (BMP) of the pBSC 230, into ATM data through the BAN, and transmits the ATM data to the WSM of the call manager 210 through the optical transceivers 310 and 320 and the optical cable 325.

The BAN includes an ATM cell mux/demux board assembly (ACMA) board for multiplexing/demultiplexing ATM cells, an ATM switch fabric board assembly (ASFA) board for providing communication paths between the BMP and other processors, an ATM E1/T1 interface board assembly (AETA) board connected to the pBTS through an E1/T1 link to exchange ATM cells with the pBTS, and an ATM STM-1 interface board Assembly (AS1A) board matched to one port of the ASFA board in a ratio of 1:1 so as to transmit and receive data to and from the WSM of the call manager 210 through a low voltage differential signaling (LVDS).

The pBSC 230 transmits the data operation/maintenance information, which is received from the BSM, to the WSM of the call manager 210 through the DAMA board, the ASFA board and the AS1A board through the optical cable 325.

As described above, the physical connection between the WSM and BMP is accomplished based upon an ATM. The BMP of the pBSC 230 is connected to an ATM interface card and the optical cable 325 through the ASFA board and the AI1A board of the BAN positioned in the WSM. However, it can be appreciated that traffic exchanged between the BMP and the WSM is data related to operation/maintenance, and is not time-dependent traffic that requires a guarantee of Quality of Service (QoS).

Accordingly, it is not necessary for the WSM and the BMP to perform ATM communication based on an expensive ATM network for handling such network traffic.

A preferred embodiment of the present invention is described in detail with reference to FIGS. 4 to 8 below.

Figure 4:
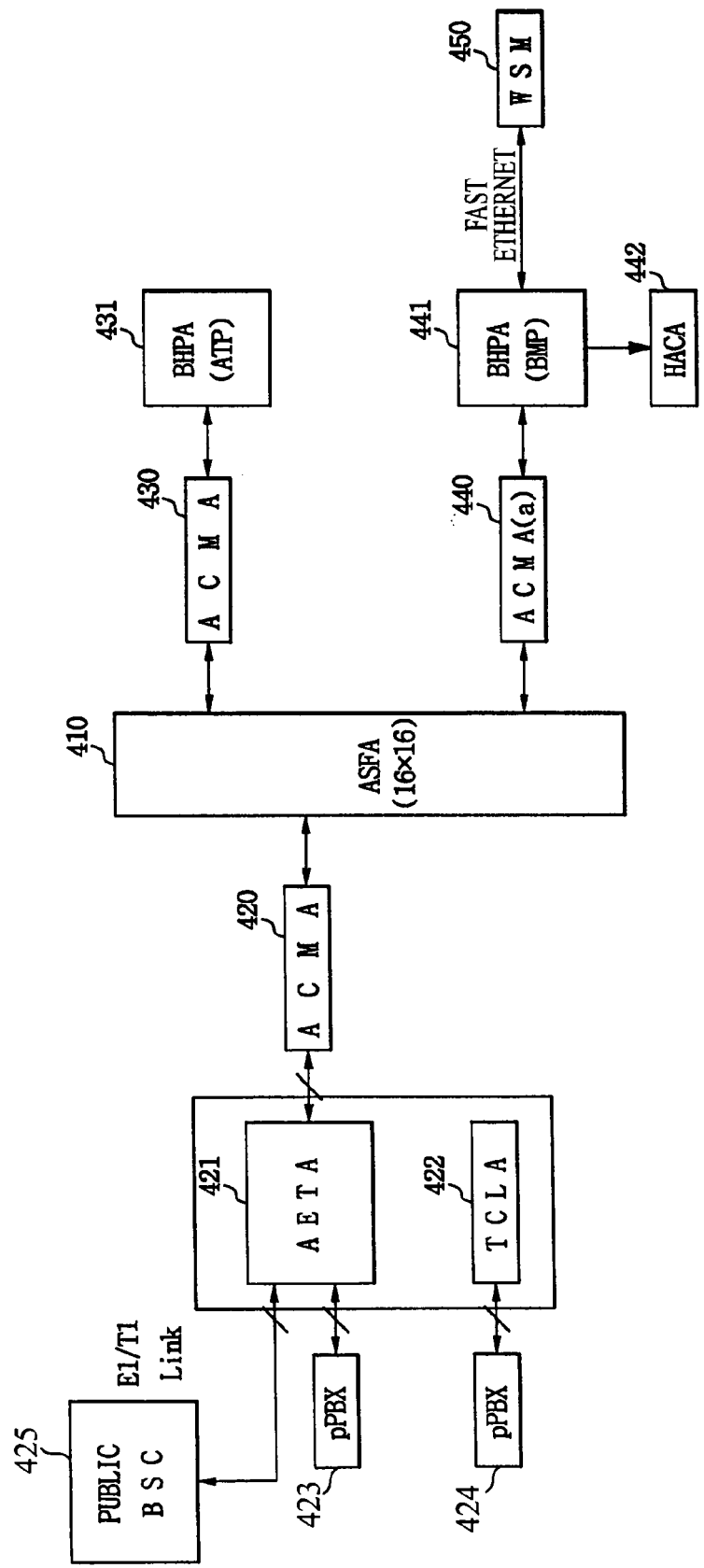
FIG. 4 is a configuration diagram of an apparatus for operating and maintaining a private mobile communication service system using a LAN in accordance with an embodiment of the present invention.

FIG. 4 is a configuration diagram of an apparatus for operating and maintaining a private mobile communication service system using a LAN in accordance with an embodiment of the present invention.

Referring to FIG. 4, the apparatus for operating and maintaining a private mobile communication service system using a LAN in accordance with an embodiment of the present invention includes an ASFA board 410 provided with an ATM switch fabric to perform ATM switching, an AETA board 421 connected to a pBSC and a pBTS (PPBX 423) through an E1/T1 link so as to transmit and receive ATM cells, a transcoder control and link assembly (TCLA) board 422 for performing a vocoder function and a gateway function for connection with a pPBX, a BSC high performance processor board assembly (BHPA) for an air termination processor (ATP) 431 that is provided with the ATP for matching with a mobile terminal in a wireless environment, a BHPA for a BMP 441 that is provided with a BMP for overall control of the pBSC, a hardware alarm collection board assembly (HACA) board 442 provided with a hardware alarm collecting block (HAB) for collecting alarm information generated in the respective elements of the pBSC, ACMA boards 420, 430 and 440 for multiplexing and demultiplexing ATM cells to provide communication paths between the respective boards 421, 422, 431 and 441 and the ASFA board 410, and a WSM 450 for operating and maintaining the pBSC while transmitting and receiving operation/maintenance information to and from the BHPA board for a BMP 441 through a Fast Ethernet link.

In this case, the AETA board 421 provides not only a communication path between the pBSC and the pBTS, but also a communication path between a public BSC 425 and the pBSC 423.

In more detail, the AETA board 421 is positioned between the pBTS and the pBSC, and between the public PBS 425 and the pBSC, and supports exchanges of all data by the BAN, including an ATM switch and connections between the pBTS and the pBSC, and between the public PBS 425 and the pBSC through an ATM-E1/T1 link.

The AETA board 421 is provided with an E1 interface unit, an ATM layer interface unit and an interprocessor communication (IPC) unit, is connected to the public BSC 425 and the pBTS through an E1/T1 link, and transmits and receives ATM cells to and from the public BSC 425 and the pBTS.

That is, the AETA board 421 transmits ATM cells, received from the public BSC 425 or pBTS, to the BHPA board for a BMP 441 through the ACMA(a) board 440 and the ASFA board 410, or ATM cells, received from the BHPA board for a BMP 441 through the ASFA board 410 and the ACMA(a) board 440, to the public BSC 425 or pBTS. A plurality of AETA boards 421 may be positioned in the pBSC as needed.

Next, the TCLA board 422 functions as a vocoder and a gateway for connecting with the pPBX 424. The number of the TCLA boards 422 is different, depending upon the extent of calls.

The TCLA board 422 converts subscriber traffic signals, such as 8 k/13 k QCELP and 8 k EVRC, into a 64 k PCM data through digital signal processor (DSP) signals, and vice versa.

The number of DSPs used in the above case is sixteen in each of the TCLA boards 422. Each of the DSPs can vocode data of eight channels. The TCLA board 422 functions to allow data to be exchanged between the E1/T1 link and the DSP through a time switch positioned in the TCLA board 422.

Each of the TCLA boards 422 accommodates a vocoder of 120 channels, provides four E1s and five T1s, and provides a No. 7 signal channel.

The BHPA board for an ATP 431 functions to process voice and data calls, control power, perform handoff, and perform MAC control and a radio link protocol (RLP).

The BHPA board for an ATP 431 functions as the air interface of the pBSC, and transmits and receives ATM cells through the ASFA board 410 and the ACMA 430.

In general, the BHPA board for an ATP 431 includes six to eight boards, which consist of two BHPA boards for processing traffic data control signals, two BHPA boards for processing circuit data, two BHPA boards for interworking with a public data switching network (PDSN), and two boards reserved for evolution-data only (EV-DO) in the future.

The two BHPA boards for interworking with a PDSN are used in the MAC layer to transmit and receive packet data across a wireless region.

MAC layers are provided in a mobile terminal and the pBSC, respectively, and each include an RLP entity and a Radio Burst Protocol (RBP) entity.

The BHPA board for a BMP 441 is the main control unit of the pBSC and functions to process the calls of the pBSC and No. 7 signals, manage the resources of the pBSC, and control an ATM link.

The HACA board 442 functions to collect hardware failure information generated by the respective boards of the pBSC, and to report the collected hardware failure information to the BHPA board for a BMP 441.

In addition, the HACA board 442 functions to generate a reset signal under the control of the BHPA board for a BMP 441 so as to remotely reset a failed board.

The HACA board 442 collects hardware failure information generated in the pBSC through a cable, transmits the hardware failure information to the BHPA board for a BMP 441, and employs a 2*5 hard metric (HM) connector and a 30AWG 5 pair twist cable.

The HACA board 442 is connected to a cable through a maximum of 21 ports, and can collect six pieces of failure information. Accordingly, the HACA board 442 can collect 126 pieces of hardware failure information.

In this case, the failure information is physically a 3.3 V LVT signal, is configured so that a failure is assigned one edge-pin, and employs a single-ended transmission method. The reset signal accommodated in the 2*5 cable together with the failure information is a 3.3 V LVT signal, and contains a synchronizing clock together with reset data to allow a reset to be reliably performed.

The ACMA boards 420, 430 and 440 function to receive data transmitted from the AETA board 421, the TCLA board 422, the BHPA board for an ATP 431, and the BHPA board for a BMP 441 by the cell, to multiplex the data, and to transmit the data to the ASFA board 410.

Additionally, the ACMA boards 420, 430 and 440 function to demultiplex cells transmitted from the ASFA board 410, to analyze the information of the cell, and to transmit the information of the cell to the AETA board 421, the BHPA board for an ATP 431, and the BHPA board for a BMP 441.

The ASFA board 410, the BHPA board for a BMP 441 and the ACMA(a) board 440 are occasionally dualized to improve the reliability of a product. A path of dualization is Fast Ethernet. The ASFA board 410 notifies a counterpart board of the state of each board to detect the failure of the board. Since the ASFA board 410, which is an ATM switching board, and the HACA board 442, which receives an alarm generated in each unit of the pBSC 425, is not provided with their processors, the BHPA board for a BMP 441 controls the ASFA board 410 through an Industry Standard Architecture (ISA) to perform an ATM switching operation, and controls the HACA board 442 through the ISA bus to read the alarm information of each unit.

The above-described boards 410, 420, 421, 422, 430, 440, 441 and 442 are mounted on a shelf backplane (not shown), and exchange various data through shared buses mounted on the shelf backplane. The shared buses consist of a single 16-bit ATM cell bus for transmitting ATM cells between the boards 410, 420, 421, 422, 430, 440, 441 and 442, an OAM data bus for exchanging various data to perform the operating/maintaining functions of the BHPA board for a BMP 441, and a local bus for transmitting other local data.

The WSM 450 has a completely modular structure in consideration of the operation and maintenance of software, and includes a general function module, an operation function module, a maintenance function module, and an additional function module.

In the meantime, operation information related to the operational function processed by the boards 410, 420, 422, 430, 431 and the maintenance information related to the maintenance function processed by the WSM 450 are collected by the HACA board 442, and reported to the BHPA board for a BMP 441.

When the BHPA board for a BMP 441 receives the operation information or maintenance information from the HACA board 442, the BHPA board for a BMP 441 sends the operation information or maintenance information to the WSM 450 through the Fast Ethernet link.

The BHPA board 441 for a BMP receives the operation information or maintenance information transmitted from the WSM 450 through the FAST Ethernet link, and transmits the operation information or maintenance information so that a failed board or the like is capable of being operated and maintained.

Figure 5:
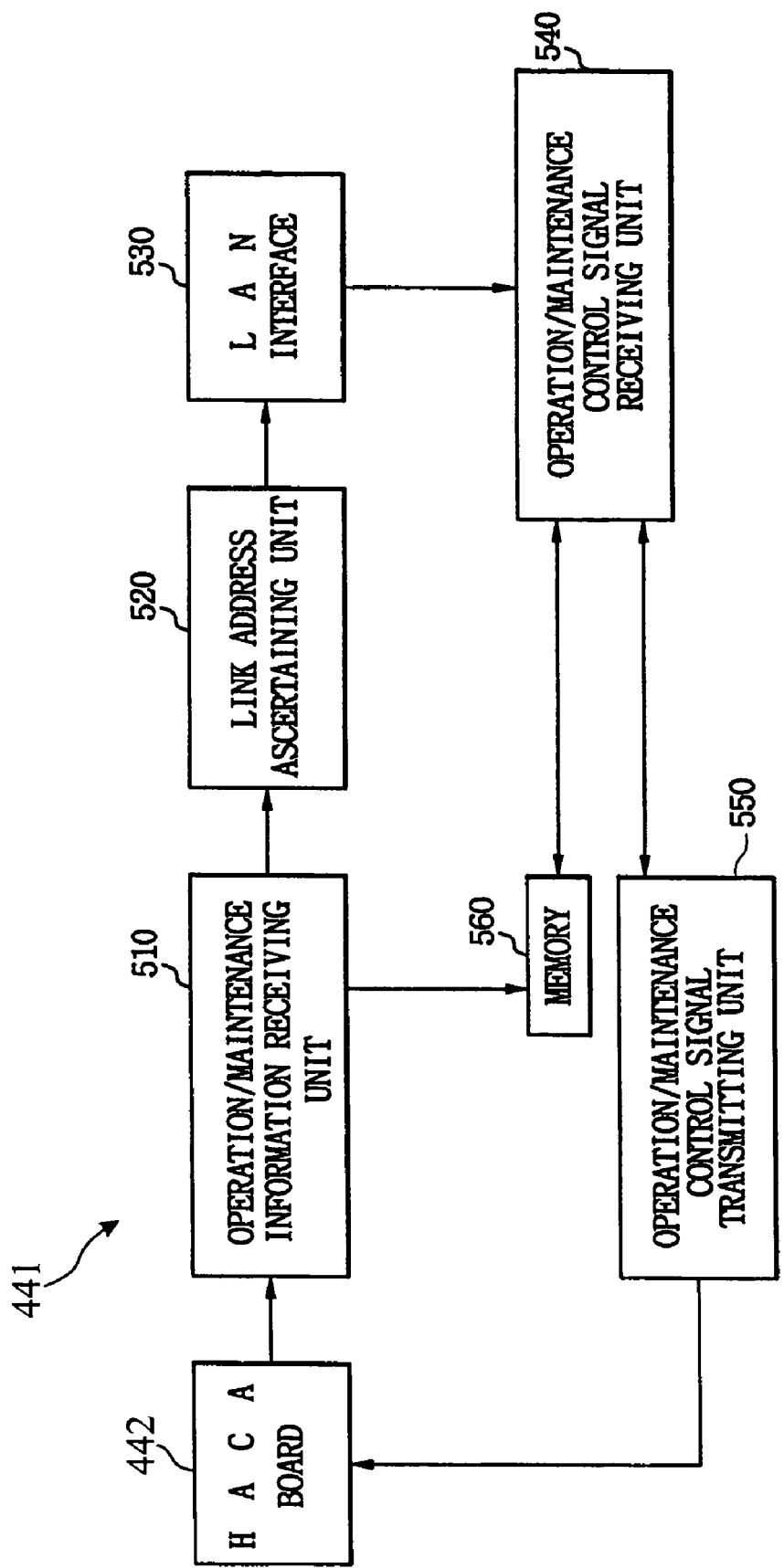
FIG. 5 is a configuration diagram of a BHPA board for the BMP of FIG. 4.

FIG. 5 is a configuration diagram of the BHPA board for a BMP of FIG. 4.

Referring to the drawing, the BHPA board for a BMP 441 includes an operation/maintenance information receiving unit 510 for receiving operation/maintenance information from the HACA board 442, a link address ascertaining unit 520 for ascertaining a link address, and for transmitting the operation/maintenance information to a LAN interface 530 if the destination of the operation/maintenance information is the WSM 450, a LAN interface 530 for providing an interface with a LAN, an operation/maintenance control signal receiving unit 540 for receiving a control signal for operation/maintenance, an operation/maintenance control signal transmitting unit 550 for transmitting an operation/maintenance control signal to the HACA board 442, and a memory 560.

The operation/maintenance information receiving unit 510 receives the operation/maintenance information from the HACA board 442, stores the operation/maintenance information in the memory 560, and transmits the operation/maintenance information to the link address ascertaining unit 520.

Then, the link address ascertaining unit 520 ascertains the destination address of the operation/maintenance information, and transmits the operation/maintenance information to the LAN interface 530 if the destination address is the WSM 450, or to the ATM network if the destination address is not the WSM 450.

The LAN interface 530 allows the operation/maintenance information to be transmitted to the WSM 450 by receiving a frame having a destination address of the WSM 450 and transmitting the frame to the LAN.

Meanwhile, the operation/maintenance control signal created in the WSM 450 is received by the operation/maintenance control signal receiving unit 540 through the LAN interface 530, and is stored in the memory 560.

Further, the operation/maintenance control signal receiving unit 540 transmits the operation/maintenance control signal to the operation/maintenance control signal transmitting unit 550, and the operation/maintenance control signal transmitting unit 550 transmits the operation/maintenance control signal to the HACA board 442 so that the HACA board 442 transmits the operation/maintenance control signal to a corresponding board.

Figure 6:
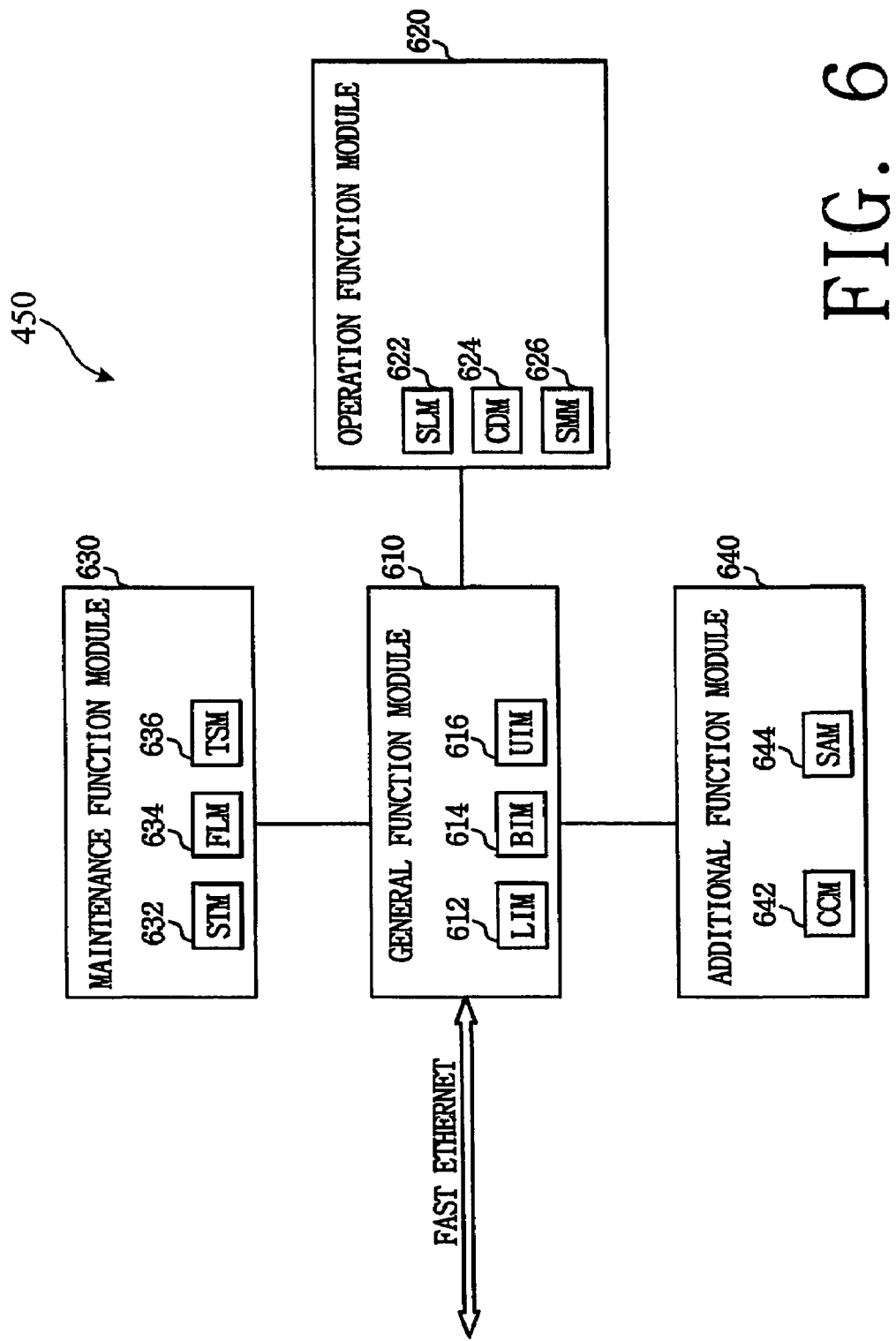
FIG. 6 is a configuration diagram of the WSM of FIG. 4.

FIG. 6 is a configuration diagram of the WSM of FIG. 4.

Referring to the drawing, the WSM 450 includes a general function module 610 for operating the WSM 450 itself and providing an external interface function, an operation function module 620 for providing an operational function for the pBSC and pBTS, such as loading, configuration management and statistics measurement, a maintenance function module 630 for providing a maintenance function for the pBSC and the pBTS, such as status monitoring, failure control and system tests, and an additional function module 640.

The general function module 610 includes a WSM initialization manager (BIM) 614 for creating and managing application parts required for the operation of the WSM 450, a LAN interface manager (LIM) 612 for processing LAN connection and data transmission and reception with the system, and a User interface manager (UIM) 616 for providing a graphic user matching function.

The operation function module 620 includes a system loading manager (SLM) 622 for handling system loading, a configuration data manager (CDM) 624 for handling configuration management, and a statistics and measurement manager (SMM) 626 for handling a statistics and measurement function.

The maintenance function module 630 includes a status manager (STM) 632 for monitoring the status of the processors of the system, various links and various devices, a fault manager (FLM) 634 for collecting the various failures and alarms of the system and reporting them to the operator, and a test manager (TSM) 636 for testing various devices and processing test calls.

The additional function module 640 includes a connection and communication manager 642 for controlling connections, and a sanity manager (SAM) for processing sanity data created in the pBSC, the pBTS and the WSM 450.

The WSM 450 creates and manages modules required at the time of operating itself using the BIM 614, receives operation information and maintenance information, transmitted from the BHPA board for a BMP 441 through the Fast Ethernet link, through the LIM 612, and transmits the operation information to a corresponding module 622, 624 or 626 of the operation function module 620, and transmits the maintenance information to a corresponding module 632, 634 or 636 of the maintenance function module 630.

The general function module 610 of the WSM 450 allows the operation control signal to be transmitted to the BHPA board for a BMP 441 of the pBSC by receiving the operation control signal transmitted to the BHPA board for a BMP 441 from the respective modules 622, 624 and 626 of the operation function module 620, and by transmitting the operation control signal on the Fast Ethernet link using the LIM 612.

Additionally, the general function module 610 of the WSM 450 allows the maintenance control signal to be transmitted to the BHPA board for a BMP 441 of the pBSC by receiving the maintenance control signal transmitted to the BHPA board for a BMP 441 from the respective modules 632, 634 and 636 of the maintenance function module 630, and by transmitting the maintenance control signal on the Fast Ethernet link using the LIM 612.

FIG. 7 is a flowchart showing processing of the operation/maintenance information in the private mobile communication service system using the LAN in accordance with an embodiment of the present invention.

The HACA board 442 collects the operation/maintenance information of the respective boards, and transmits the collected operation/maintenance information to the BHPA board for a BMP 441 at step S110.

Thereafter, the BHPA board for a BMP 441 stores the operation/maintenance information in the memory at step S112.

Then, the BHPA board for a BMP 441 ascertains a link address to which the operation/maintenance information is transmitted at step S114, determines whether the operation/maintenance information is used for the WSM 450 at step S116, transmits the operation/maintenance information to the ATM network at step S118 if the operation/maintenance information is not used for the WSM 450, and transmits the operation/maintenance information to the WSM 450 at step S120 if the operation/maintenance information is used for the WSM 450.

Thereafter, after the general function module 610 of the WSM 450 receives the operation/maintenance information using the LAN interface module 612, the general function module 610 transmits the operation information to the operation function module 620 and the maintenance information to the maintenance function module 630 at step S122 so that a corresponding function module processes data at step S124.

FIG. 8 is a flowchart showing the processing of the operation/maintenance control signal in the private mobile communication service system using the LAN in accordance with an embodiment of the present invention.

First, the corresponding function module of the WSM 450 creates the operation/maintenance control signal at step S210, and the corresponding function module transmits the operation/maintenance control signal to a LAN interface at step S212.

Thereafter, the LAN interface transmits the operation/maintenance control signal to the LAN interface 530 of the BHPA board for a BMP 441 through the LAN at step S214.

The BHPA board for a BMP 441 receives the operation/maintenance control signal through the LAN interface 530, stores the operation/maintenance control signal in the memory 560 at step S216, and transmits the operation/maintenance control signal to the HACA board 442 at step S218.

The HACA board 442 transmits the operation/maintenance control signal to a corresponding board so that proper operation/maintenance is performed at step S220.

Meanwhile, although Fast Ethernet has been described as being an example of the LAN, the LAN is not limited to Fast Ethernet, but various types of LANs maybe employed in the present invention.

As described above, the present invention provides an apparatus and method for operating and maintaining a private mobile communication service system, in which a LAN is used as a network interface between a WSM 450 and a BMP so that it is not necessary to mount an AS1A and an STIM on a rack of a pBSC, thus providing a great cost reduction.

Additionally, in accordance with the present invention, the WSM 450 and the BMP are connected to each other by the LAN so that they can be connected to each other using the IP network without the limitation of distance.

Although preferred embodiments of the present invention have been disclosed for illustrative purposes, those skilled in the art will appreciate that various modifications, additions and substitutions are possible without departing from the scope and spirit of the invention, as described in the accompanying claims.

What is claimed is:

1. An apparatus for operating and maintaining a private mobile communication service system using an internet protocol (IP) network, the private mobile communication service network having a private base station controller (pBSC) and a base station transceiver subsystem (BTS), said apparatus comprising:

a wireless system manager (WSM) for receiving operation/maintenance information from the pBSC through the IP network, processing the operation/maintenance information, creating an operation/maintenance control signal, and transmitting the operation/maintenance control signal to the pBSC through the IP network;

a hardware alarm collection unit mounted on the pBSC for collecting operation/maintenance information from at least one board and outputting the operation/maintenance information, and for receiving an operation/maintenance control signal from said at least one board and generating a reset signal for said at least one board; and a base station controller main processor (BMP) responsive to the operation/maintenance information being received from the hardware alarm collection unit for ascertaining a link address and for transmitting the operation/maintenance information when the link address is the WSM, and responsive to the operation/maintenance control signal being received from the WSM through the IP network for transmitting the operation/maintenance control signal to the hardware alarm collection units;

wherein the WSM comprises a maintenance function module for receiving the operation/maintenance information from the BMP, for providing a maintenance function including at least one of system status monitoring, system failure control and system tests, and for creating and outputting the operation/maintenance control signal; and wherein the maintenance function module comprises:
a status manager for monitoring the status of processors of the system, various links and various devices;
a fault manager for collecting failures and alarms of the system, and for reporting them to an operator; and
a test manager for testing devices and processing test calls.

2. The apparatus as set forth in claim 1, wherein the IP network is a Fast Ethernet link.

3. The apparatus as set forth in claim 1, wherein the WSM further comprises:
an operation function module for receiving the operation information from the BMP, for providing operation functions including at least one of loading, configuration management and statistics measurement, and for creating and outputting the operation control signal; and
a general function module for receiving the operation/maintenance information from the BMP through the IP network, for outputting the operation information to the operation function module, for transmitting the maintenance information to the maintenance function module, for receiving the operation/maintenance control signal from the operation module and the maintenance module, and for transmitting the operation/maintenance control signal to the BMP through the IP network.

4. The apparatus as set forth in claim 3, wherein the operation function module comprises:
a system loading manager for handling system loading;
a configuration data manager for handling configuration management; and
a statistics and measurement manager for handling a statistics and measurement function.

5. The apparatus as set forth in claim 3, wherein the general function module comprises:
a WSM initialization manager for creating and managing application parts required for operation of the WSM;
a local area network (LAN) interface manager for processing a LAN connection, and data transmission and reception with the system; and a user interface manager for proving a graphic user matching function.

6. The apparatus as set forth in claim 1, wherein the BMP comprises:
a local area network (LAN) interface for providing an interface with a LAN to allow an IP communication with the WSM;
an operation/maintenance information transmission unit responsive to the operation/maintenance information being received from the hardware alarm collection unit for ascertaining the link address, and for transmitting the operation/maintenance information to the WSM through the LAN interface if the link address is the WSM; and
an operation/maintenance control signal transmission unit for receiving the operation/maintenance control signal from the WSM through the LAN interface, and for transmitting the operation/maintenance control signal to the hardware alarm collection unit.

7. The apparatus as set forth in claim 6, wherein the operation/maintenance information transmission unit comprises:
an operation/maintenance information receiving unit for receiving the operation/maintenance information from the hardware alarm collection unit; and
a link address ascertaining unit for ascertaining the link address of the operation/maintenance information received from the operation/maintenance information receiving unit, and for transmitting the operation/maintenance information to the WSM through the LAN interface if the link address is the WSM.

8. The apparatus as set forth in claim 6, wherein the operation/maintenance control signal transmission unit comprises:
an operation/maintenance control signal receiving unit for receiving the operation/maintenance control signal from the WSM through the LAN interface; and
an operation/maintenance control signal transmitting unit for transmitting the operation/maintenance control signal to the hardware alarm connecting unit.

9. A method of operating and maintaining a private mobile communication service system using an IP network, the private mobile communication service network having a pBSC and a base station transceiver system (BTS), said method comprising the steps of:

(a) ascertaining, at a base station main processor (BMP), a link address of operation/maintenance information of at least one board collected by a hardware alarm collection unit;

(b) when the link address is ascertained to be a wireless system manager (WSM), transmitting the operation/maintenance information to the WSM through the IP network and processing the operation/maintenance information at the WSM;

(c) creating an operation/maintenance control signal at the WSM and transmitting the operation/maintenance control signal to the BMP through the IP network; and (d) transmitting, at the BMP, the operation/maintenance control signal to the hardware alarm collection unit, and creating and outputting, at the hardware alarm collection unit, a reset signal for said at least one board;

wherein step (b) comprises transmitting the operation/maintenance information to a maintenance function module of the WSM; and wherein the method further comprises the steps of:
monitoring, at a status manager of the maintenance function module, the status of processors, various links and various devices;

at a fault manager of the maintenance function module, collecting failures and alarms and reporting them to an operator; and at a test manager of the maintenance function module, testing devices and processing test calls.

10. The method as set forth in claim 9, wherein step (a) comprises:

collecting, at the hardware alarm collection unit, the operation/maintenance information of the board and transmitting the operation/maintenance information to the BMP; and ascertaining, at the BMP, the link address of the operation/maintenance information.

11. The method as set forth in claim 9, wherein step (b) comprises:

when the link address is ascertained to be the WSM, transmitting, at the BMP, the operation/maintenance information to the WSM through the IP network;

receiving, at a general function module of the WSM, the operation/maintenance information through the IP network;

transmitting, at the general function module, the operation information to an operation function module to process the operation information; and transmitting, at the general function module, the maintenance information to a maintenance module to process the maintenance information.

12. The method as set forth in claim 9, wherein step (d) comprises:

receiving, at the BMP, the operation/maintenance control signal through the IP network;

transmitting, at the BMP, the operation/maintenance control signal to the hardware alarm collection unit; and creating and outputting, at the hardware alarm collection unit, the reset signal for the board.

13. In an apparatus for operating and maintaining a private mobile communication service system using an internet protocol (IP) network, the private mobile communication service network having a private base station controller (pBSC) and a base station transceiver subsystem (BTS); a wireless system manager (WSM) comprising:

operation function module means for receiving operation information, for providing operation functions including at least one of loading, configuration management and statistics measurement, and for creating and outputting an operation control signal;

maintenance function module means for receiving operation/maintenance information, for providing a maintenance function including at least one of system status monitoring, system failure control and system tests, and for creating and outputting an operation/maintenance control signal; and general function module means for receiving the operation/maintenance information, for outputting operation information to the operation function module means, for transmitting maintenance information to the maintenance function module means, for receiving the operation control signal from the operation module means and the operation/maintenance control signal from the maintenance module means, and for transmitting the operation/maintenance control signal through the IP network;

wherein the maintenance function module means comprises:

a status manager for monitoring the status of processors of the system, various links and various devices;

a fault manager for collecting various failures and alarms of the system and reporting them to an operator; and a test manager for testing various devices and processing test calls.

14. In the apparatus of claim 13, wherein the operation function module means comprises:

a system loading manager for handling system loading;

a configuration data manager for handling configuration management; and a statistics and measurement manager for handling a statistics and measurement function.

15. In the apparatus of claim 13, wherein the general function module comprises:

a WSM initialization manager for creating and managing application parts required for operation of the WSM;

a LAN interface manager for processing LAN connection and data transmission and reception with the system; and a user interface manager for proving a graphic user matching function.

16. In the apparatus of claim 13, said apparatus further comprising a hardware alarm collection unit mounted on the pBSC for collecting the operation/maintenance information from at least one board and outputting the operation/maintenance information, and for receiving the operation/maintenance control signal from said at least one board and generating a reset signal for said at least one board.

17. In the apparatus of claim 13, said apparatus further comprising a base station controller main processor (BMP) responsive to the operation/maintenance information being received for ascertaining a link address and for transmitting the operation/maintenance information when the link address is the WSM, and responsive to the operation/maintenance control signal being received from the WSM through the IP network for transmitting the operation/maintenance control signal to a hardware alarm connecting unit.

18. In an apparatus for operating and maintaining a private mobile communication service system using an internet protocol (IP) network, the private mobile communication service network having a private base station controller (pBSC), a wireless system manager (WSM), and a base station transceiver subsystem (BTS); a base station controller main processor (BMP) comprising:

a local area network (LAN) interface for providing an interface with a LAN to allow an IP communication;

an operation/maintenance information transmission unit responsive to reception of operation/maintenance information for ascertaining a link address, and for transmitting the operation/maintenance information through the LAN interface when the link address is a certain address; and an operation/maintenance control signal transmission unit for receiving an operation/maintenance control signal through the LAN interface, and for transmitting the operation/maintenance control signal to a hardware alarm collection unit;

wherein the WSM comprises a maintenance function module for receiving the operation/maintenance information from the BMP, for providing a maintenance function including at least one of system status monitoring, system failure control and system tests, and for creating and outputting the operation/maintenance control signal; and wherein the maintenance function module comprises:

a status manager for monitoring the status of processor of the system, various links and various devices;

a fault manager for collecting failures and alarms of the system, and for reporting them to an operator; and a test manager for testing devices and processing test calls.

* * * * *